United States Patent [19]

Nakagawa et al.

[11] Patent Number: 4,809,118
[45] Date of Patent: Feb. 28, 1989

[54] PCM HELICAL-SCAN MAGNETIC RECORD/PLAYBACK SYSTEMS

[75] Inventors: Shozo Nakagawa; Katsuya Yokoyama, both of Tokyo; Hironobu Katayama, Kanagawa, all of Japan

[73] Assignee: Nippon Hoso Kyokai, Tokyo, Japan

[21] Appl. No.: 854,693

[22] Filed: Apr. 22, 1986

Related U.S. Application Data

[63] Continuation-in-part of Ser. No. 710,512, Mar. 11, 1985, abandoned, which is a continuation of Ser. No. 265,345, May 19, 1981, abandoned, which is a continuation of Ser. No. 57,998, Jul. 16, 1979, abandoned.

[30] Foreign Application Priority Data

Jul. 19, 1978 [JP] Japan ................... 53-87132

[51] Int. Cl.$^4$ ............................................. H04N 5/78
[52] U.S. Cl. .................................. 360/33.1; 360/19.1; 358/343
[58] Field of Search ...................... 360/10, 11, 19, 33, 360/84, 33.1, 85, 107

[56] References Cited

U.S. PATENT DOCUMENTS

| | | | |
|---|---|---|---|
| 3,157,739 | 11/1964 | Okamura | 360/10 X |
| 3,213,204 | 10/1965 | Okamura | |
| 3,463,878 | 8/1969 | Nassimbene | 360/84 |
| 3,506,780 | 4/1970 | Camras | 358/145 X |
| 3,662,101 | 5/1972 | Segerstrom | 360/10.3 |
| 3,700,798 | 10/1972 | Sluys et al. | 360/33 |
| 3,701,846 | 10/1972 | Zenzefilis | 360/19 X |
| 3,721,773 | 3/1973 | Kluge | 360/107 X |
| 3,869,709 | 3/1974 | Yamagishi et al. | 360/10.3 |
| 3,934,264 | 1/1976 | Dann et al. | |
| 3,988,517 | 7/1976 | Chimura et al. | 360/84 X |
| 4,009,331 | 2/1977 | Goldmark et al. | 360/10 X |
| 4,021,857 | 5/1977 | Tanimura | 360/84 |
| 4,025,959 | 5/1977 | Warren | 360/85 |
| 4,035,843 | 7/1977 | Tanimura | 360/10 X |
| 4,075,666 | 2/1978 | Lomax et al. | 360/11 |
| 4,138,694 | 2/1979 | Doi et al. | 360/32 |
| 4,139,873 | 2/1979 | Maxey | 360/85 |
| 4,141,047 | 2/1979 | Kambara et al. | 360/77 |
| 4,159,480 | 6/1979 | Tachi | 360/14 X |
| 4,179,717 | 12/1979 | Maxey | 360/84 |
| 4,183,067 | 1/1980 | Kihara et al. | 360/75 |
| 4,199,793 | 4/1980 | Baldwin | 360/84 X |
| 4,206,440 | 6/1980 | Doi et al. | 371/39 |
| 4,233,627 | 11/1980 | Sugihara | 358/145 |

FOREIGN PATENT DOCUMENTS

| | | | |
|---|---|---|---|
| 11212 | 5/1975 | Japan | |
| 17801 | 6/1975 | Japan | |
| 83018 | 7/1977 | Japan | |
| 53-129012 | 10/1978 | Japan | 360/33.1 |
| 1155615 | 6/1969 | United Kingdom | 360/11 |
| 2027252 | 2/1980 | United Kingdom | 360/10.3 |

OTHER PUBLICATIONS

NHK Laboratories Note: Dec. 1977, Ser. No. 221; Shibaya et al.; "PCM Video Recording Using a Rotating Magnetic sheet".
SMPTE Journal, No. 3, vol. 89; Mar. 1980, pp. 173–180; Yokoyama et al.; "An Experimental Digital Videotape Recorder".
"Basic System Parameters for 1-in Type B Helican Scan Video Recording"; SMPTE Journal, vol. 87, Feb. 78, pp. 98–93.
SMPTE Journal, Apr. 1957, vol. 66, #4, pp. 184–188, copy provided by applicant.
Cover sheet only SMPTE, Journal, Oct. 1975, vol. 84, No. 10.

Primary Examiner—Aristotelis M. Psitos
Attorney, Agent, or Firm—Spencer & Frank

[57] ABSTRACT

In a helical-scan magnetic record/playback system, n magnetic heads (where n is an integer greater than one) are disposed close to the outer wall of a head drum, spaced from one another by $2\pi/n$ radians with respect to the rotational axis of the head drum and also spaced from one another by approximately 1/n of the width of a magnetic tape in the axial direction of the head drum. The magnetic tape is wound around the head drum over an angle of $2\pi/n$ radians or more with respect to the rotational axis of the drum. With the rotation of the head drum, a video signal is time-sequentially divided for recording on n tracks of the tape and for reproduction therefrom. The invention results in reduced friction between the tape and the drum, thereby providing smooth travel and easy loading of the tape. According to this invention, a still or slow-motion picture can be reproduced without an external memory and the reciprocal travel of the tape.

4 Claims, 14 Drawing Sheets

FIG_15

PCM HELICAL-SCAN MAGNETIC RECORD/PLAYBACK SYSTEMS

This application is a continuation-in-part of application Ser. No. 06/710,512, filed Mar. 11th, 1985 (now abandoned) which is a continuation of application Ser. No. 06/265,345 filed May 19th, 1981 (now abandoned) which in turn is a continuation of application Ser. No. 06/057,998 filed July 16th, 1979 (now abandoned).

BACKGROUND OF THE INVENTION

1. Field of the invention.

The invention relates to a magnetic record/playback system for a helical-scan magnetic record/playback apparatus (referred to as a helical-scan VTR) and, more particularly, to a magnetic record/playback system suitable for use with a magnetic record/playback apparatus (referred to as a VTR) in which a television picture signal is PCM-modulated and recorded, and is then reproduced through inverse processes.

2. Prior Art

VTRs of this type have been widely used for home-use picture recording apparatus. Recent remarkable developments in peripheral circuitry have solved technical problems, for example, large time-axis jitter, and have improved the characteristics of VTRs. Home-use VTRs recently available on the market, accordingly, have excellent characteristics in comparison with four-head VTRs for broadcasting purposes, and feature compact size, light weight, low cost and the like.

Development of the helical-scan VTR has placed emphasis on improvements in its characteristics. However, it is required that the characteristics and operability of the VTR be further improved so that it can be used in additional applications. In order to use a VTR of this type in the broadcasting field, an editing function is essential and, in addition, the function of reproducing a still picture or slow-motion picture is also required.

Various types of record/playback systems for helical-scan VTRs have been proposed which modify the way in which the tape is wound or wrapped around a head drum or the number of magnetic heads used. One of these modifications is the SMPTE (Society of Motion Picture and Television Engineers) system. The SMPTE system and the technical problem involved will briefly be described.

In the record playback system for the type-C VTR of SMPTE (SMPTE Journal: vol. 87, Mar., 1978; C98. 18, C98. 19, pp. 163-165), a magnetic tape is scanned in a manner such that signals in one field are recorded in response to one rotation of a magnetic head, thus avoiding so-called in-picture switching. Here, the in-picture switching means switches a reproduction or playback head during a horizontal blanking interval other than the vertical blanking interval. For this reason, the magnetic tape is scanned by winding the tape substantially entirely around a head drum or cylinder. Therefore, friction between the drum and the tape is large and this frequently impedes travel of the tape. Further, such a structure makes it difficult to load the tape. Particularly, when the magnetic tape used is a cassette tape, the tape must be pulled out of the cassette after loading in a VTR and then wound around the head drum. Accordingly, a very complicated structure is required for performing this operation. In an alpha type or an omega type wrap format VTR in which the magnetic tape is wound around the head drum by approximately 360° or more, it is difficult to realize a simple and small-sized record/playback structure for a cassette tape.

In a type-B record/playback system of SMPTE (SMPTE Journal: vol. 87, February 1978; C98. 15, C98. 16, pp. 89-90), the magnetic tape is wound around the head drum over an angle of approximately 180°, with first and second heads separately disposed with the same heights in the rotational-axis direction of the head drum. With such a construction, a television picture signal (a video signal) of one field is recorded on five tracks of the tape during 2.5 rotations of the head drum. Accordingly, the first and second heads scan the same track when the tape stops travelling so that only 1/5 of one field video signal is played back for one head rotation. Therefore, an external memory with a large memory capacity and means for moving the tape in a reciprocal manner must be provided for playing back slow-motion pictures or still pictures. This results in the need for various kinds of drive and control circuits, leading to complex circuit construction.

SUMMARY OF THE INVENTION

Accordingly, an object of the invention is to provide a magnetic record/playback system for a helical-scan VTR which has reduced friction between the magnetic tape and drum thereby providing smooth travel and easy loading of the tape.

This object is achieved by setting the winding or wrapping angle of the magnetic tape around the drum to 180° or less.

Another object of the invention is to provide a magnetic record/playback system for a magnetic record/playback apparatus which can reproduce still and slow-motion pictures without an external memory and reciprocal travel of the magnetic tape.

To achieve these objects, the heads are disposed with respect to the drum and the tape is scanned in such a way that one rotation of the drum corresponds to one field period of a recording signal and, even when tape travel stops, one field video signal can be reproduced by one rotation of the drum. In a helical-scan magnetic record/playback system according to the invention, n magnetic heads (where n is an integer greater than one) are disposed close to the outer wall of a head drum, spaced from one another by $2\pi/n$ radians with respect to the rotational axis of the head drum and also spaced from one another by approximately $1/n$ of the width of the magnetic tape in the axial direction of the head drum. The magnetic tape is wound around the head drum over an angle of $2\pi/n$ radians or more with respect to the rotational axis of the drum. With the rotation of the head drum, a video signal is time-sequentially divided for recording on n tracks of the tape and for reproduction therefrom.

With these objects in mind, the following description, by way of nonlimiting embodiments of this invention, is given in conjunction with the following drawings.

DESCRIPTION OF THE PREFERRED EMBODIMENTS

Figure 1:
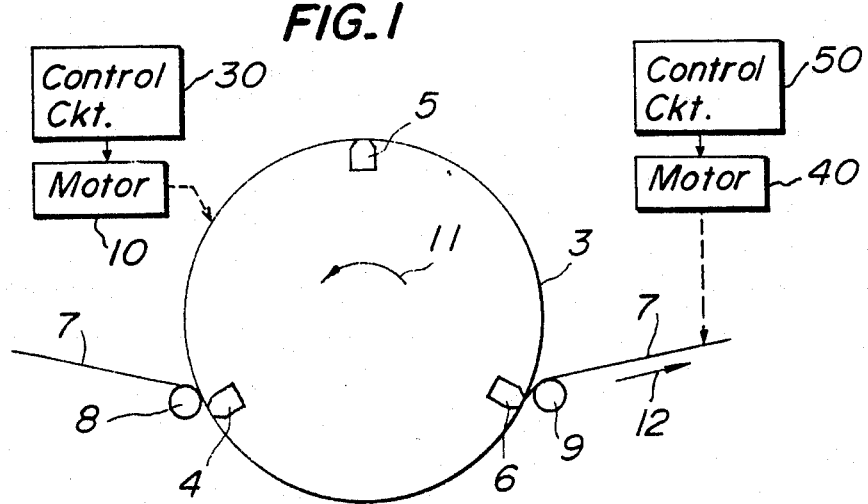
FIGS. 1 and 2 are front and side views respectively showing an embodiment of a magnetic record/playback system according to the invention having three magnetic heads.
Figure 2:
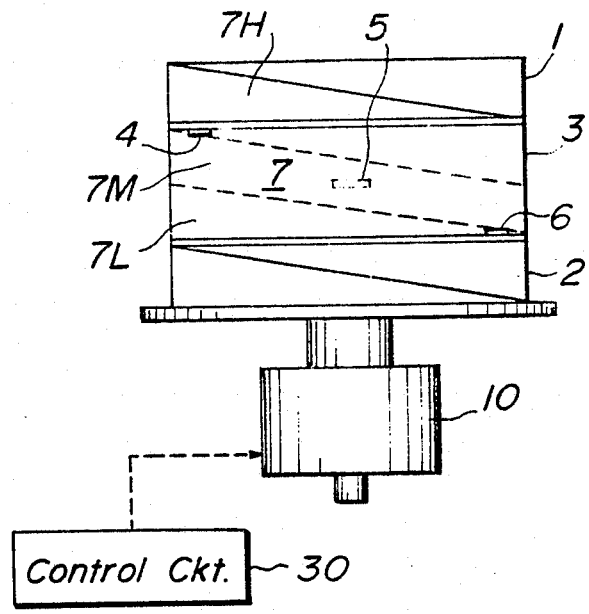

Referring now to the drawings and particularly FIGS. 1 to 4, there is shown an embodiment of a record/playback system according to the invention. In FIGS. 1 and 2, reference numerals 1 and 2 designate upper and lower fixed drums, respectively. A rotating head drum 3 is rotatably sandwiched between the fixed drums 1 and 2. As shown, three magnetic heads 4 to 6 are disposed circumferentially around the outer periphery of the rotating head drum 3, with equiangular intervals of $2\pi/3$ radians, i.e. 120°, about the rotational axis of the drum 3 and with equal intervals within the width range of a magnetic tape 7 in the drum axial direction. The length (height) of the rotating drum 3 extending in the drum axial direction is approximately ⅔ of the width of the tape 7. The magnetic head 4 is located at the upper end of the rotating drum 3; the head 5 at the middle portion of the drum 3; and the head 6 at the lower end of the rotating drum 3.

A pair of poles 8 and 9 are disposed close to and around the peripheral outer surface of the rotating drum 3. The poles 8 and 9 are spaced from each other by an angle which is slightly larger than $2\pi/3$ radians. The magnetic tape 7 enters between the pole 8 and the rotating drum 3, passes along the peripheral outer surface of the rotating drum 3, and between the pole 9 and the rotating drum 3 and then travels out to the righthand side as shown in FIG. 1. A motor 10 drives the rotating drum 3 to rotate the magnetic heads 4, 5 and 6 in the direction of the arrow 11. Thus, the magnetic tape 7, being wrapped around the peripheral outer surface of the rotating drum 3 over approximately $2\pi/3$ radians, travels in the direction of the arrow 12 in FIG. 1.

Further, in FIG. 1, the rotating speed of the motor 10 is controlled by a conventional control circuit 30 so that the motor 10 rotates at a required speed. On the other hand, the tape 7 is driven by a motor 40 and travels in the direction of the arrow 12. The rotating speed of the motor 40 is controlled by a conventional control circuit 50 so that the tape 7 travels at a required speed. Further, the control circuits 30 and 50 can adjust the motor speed and the tape speed, respectively.

Figure 3:
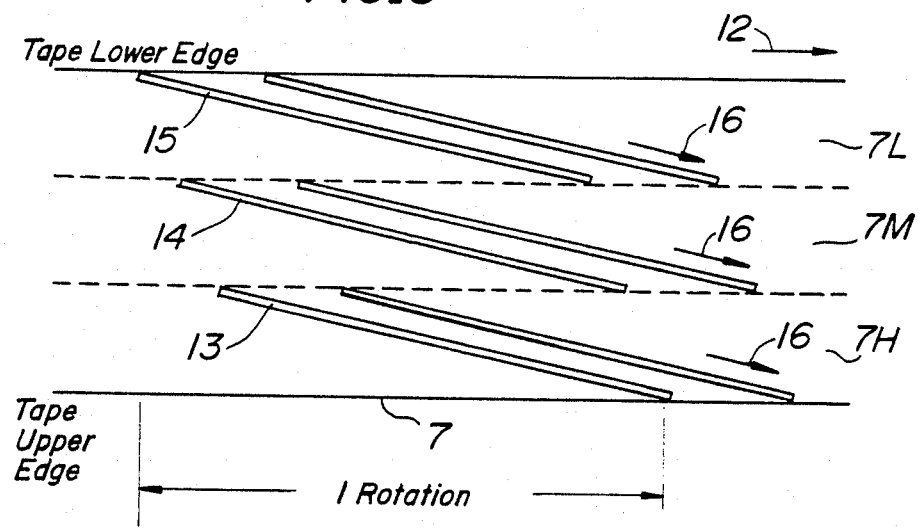
FIG. 3 diagrammatically illustrates a recording pattern of a video signal when it is recorded by the record/playback system shown in FIGS. 1 and 2.

As described above, in the above-mentioned construction of the magnetic record/playback system, the tape 7 is wrapped around the rotation head drum 3 at an angle which is slightly larger than 120°, and the three magnetic heads 4 to 6 time-sequentially scan upper, middle and lower tracks 7H, 7M and 7L on magnetic tape 7. Accordingly, one rotation of the rotation head drum 3 fragmentarily records a video signal of one field on the respective tracks 7H, 7M and 7L in time-sequential manner, or plays it back in the same manner. A recording pattern of the video signal recorded by this magnetic record/playback system is illustrated in FIG. 3 which shows the sequential patterns 13, 14 and 15 formed by the magnetic heads 4, 5 and 6 respectively. The respective heads 4, 5 and 6 scan the tape 7 in the direction of the arrow 16, i.e. from the left-hand upper edge of the tape 7 toward the right-hand lower edge of the tape 7. Further, the tape 7 shown in FIG. 3 shows the recorded surface of the tape 7 in FIG. 2, and thus the tape edges in FIG. 3 are illustrated upside down in comparison with the edges shown in FIG. 2.

Figure 4:
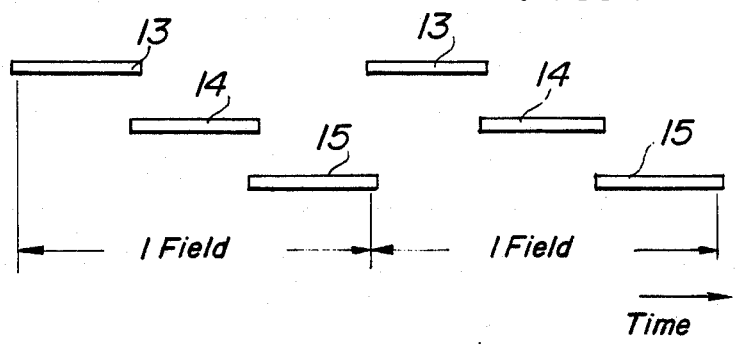
FIG. 4 diagrammatically illustrates the relationship between tracks with respect to time in the recording pattern illustrated in FIG. 3.

FIG. 4 shows the relationship between recorded or reproduced video signals with respect to time in the magnetic record/playback system mentioned above. As shown, three magnetic heads 4, 5 and 6 time-sequentially record one field video signal on three tracks 13, 14 and 15, each of which contains a video signal during ⅓ of a field period. As will be recalled, the tape wrapping angle is slightly larger than $2\pi/3$ and hence the tape scanning time of each head is slightly longer than a ⅓ field period. Therefore, the respective scanning periods slightly overlap each other, as shown in FIG. 4, thereby preventing the video signal from being partially dropped out.

As described above, in the magnetic record/playback system according to the invention, one rotation of the rotating head drum 3 records three fragmentary video signals, sequentially. Each of these three video signals is assigned a ⅓ field period in such a manner that they are sequentially combined to form an original video signal on the respective corresponding tracks of the magnetic tape 7. The recorded video signals are reproduced from the tape 7 in a similar manner. Accordingly, when it is desired to reproduce still or slow-motion pictures in a playback mode, there is no need for an external memory, unlike the conventional type-B VTR of SMPTE, and further there is no need for the tape reciprocal operation. More specifically, in the case of still picture playback the travel of the magnetic tape 7 is stopped by the control circuit 50, while the head drum 3 is rotating under the control of the control circuit 30. As a result, the three magnetic heads 4, 5 and 6 scan the recorded tape 7 to fragmentarily reproduce a video signal of one field on the respective tracks 7H, 7M and 7L in time-sequential manner during one rotation of the head drum 3. Accordingly, the heads 4, 5 and 6 repeatedly trace the same recorded patterns 13, 14 and 15 while the head drum 3 is rotating by means of the motor 10, so that the video signals derived sequentially from the heads 4, 5 and 6 form a still picture while the drum 3 is rotating.

In this case, the travelling of the tape 7 is stopped, so that the heads 4, 5 and 6 fail to trace the recorded pattern exactly. In other words, when a head is tracing one track, the head tracing this track is gradually shifting to trace an adjacent track. As a result, the signals on these two tracks are detected by one head at a time. This means that a signal obtained from the head is a mixture of signals on the two tracks. Accordingly, the original signal cannot be reproduced exactly and a part of the reproduced still picture is dropped out. This picture, even though it is not perfect, can be used where rough reproductions is sufficient, as, for example, when an editing point is being searched. In order to obtain perfect still pictures, it is necessary to move the heads in a direction perpendicular to the track direction so as to perform tracking. This tracking technique is discussed in detail in an article entitled "The Design Philosophy of the VPR-1 Helical Scan Machine with Automatic Scan Tracking" by R.A. Hathaway and R. Ravizza, 10th International Television Symposium E-6, March 1977.

In order to reproduce a slow-motion picture, the magnetic tape 7 travels at a desired slow speed under the control of the control circuit 50, while the head drum 3 is rotating under the control of the control circuit 30. For the sake of reproducing a perfect slow-motion picture without a picture tracking error, it is necessary to employ the tracking technique disclosed in the above-mentioned article.

While in the above-mentioned embodiment, three magnetic heads 4, 5 and 6 are used, the number of magnetic heads may be a different number. The description to follow with reference to FIGS. 5 to 8 relates to a case where two magnetic heads are used. In FIGS. 5 to 8, like numerals are used to designate like or equivalent parts or portions in the previously described embodiment shown in FIGS. 1 to 4.

Figure 5:
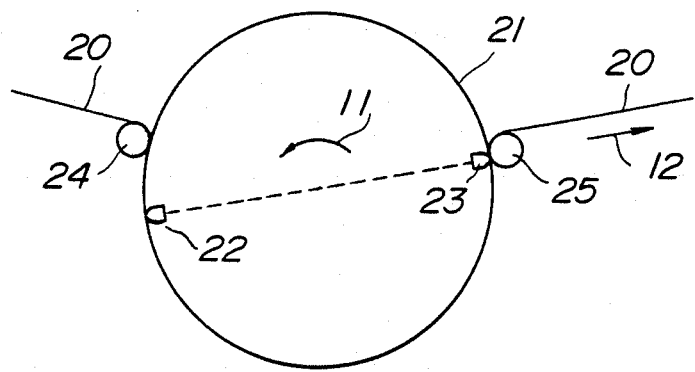
FIGS. 5 and 6 are top and side views respectively of another embodiment of the magnetic record/playback system according to the invention having two magnetic heads.
Figure 6:
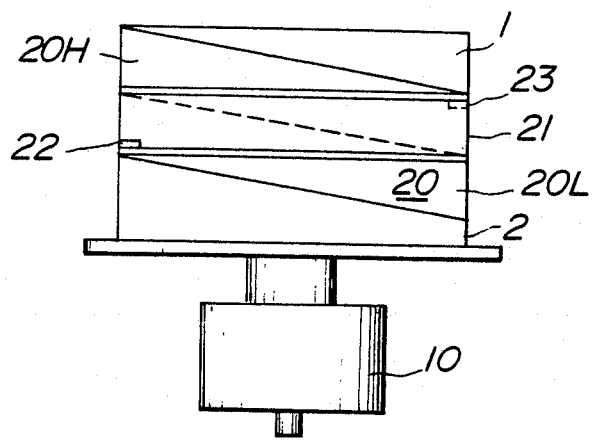

In the embodiment of FIGS. 5 and 6, a rotating head drum 21 with a height which is approximately ½ of the width of the magnetic tape 20, is disposed between the upper fixed drum 1 and the lower fixed drum 2. The rotating head drum 21 is rotatable in the direction of the arrow 11 shown in FIG. 5 in response to the drive by the motor 10. A pair of magnetic heads 22 and 23 are disposed on the peripheral outer surface of the rotating head drum 21, being spaced from each other by $2\pi/2$, i.e. 180°, with respect to the axis of the drum 21, and further by an interval of ½ of the width of the magnetic tape 20 in the axial direction of the head drum 21, as shown in FIG. 6, with the head 22 located at the lower edge of the rotating drum 21 and the head 23 located at the upper edge.

Two poles 24 and 25 are disposed close to the peripheral outer surface of the rotation head drum 21, spaced with an angular interval therebetween of slightly over $2\pi/2$ radians. The magnetic tape 20 advances between the pole 24 and the rotation head drum 21 and passes out between the pole 25 and the rotating drum 21. Between the poles 24 and 25, the magnetic tape 20 wound around the head drum 21 extends over an angular range exceeding slightly 180°.

Figure 7:
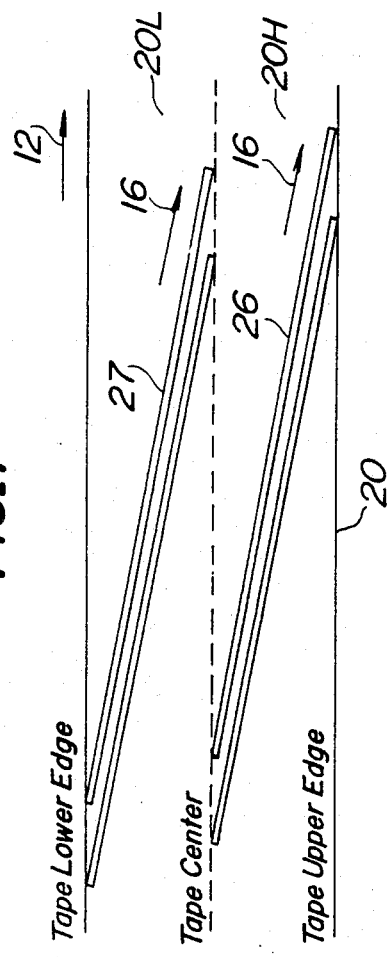
FIG. 7 diagrammatically illustrates a recording pattern of a video signal when it is recorded by the magnetic record/playback system shown in FIGS. 5 and 6.

As described above, two magnetic heads 22 and 23 scan time-sequentially upper and lower tracks 20H and 20L of the magnetic tape 20 while the tape 20 is wrapped around the rotating drum 21 over an angle slightly greater than 180°. Through one rotation of the rotating drum 21, the video signal of one field is divided into two sections to be time-sequentially recorded on the two tracks of the magnetic tape 20. The thus recorded video signal is time-sequentially reproduced from the tape 20. A recording pattern on the magnetic tape 20 thus recorded is as shown in FIG. 7 where fragmentary patterns 26 and 27 are formed by the heads 22 and 23, respectively.

Figure 8:
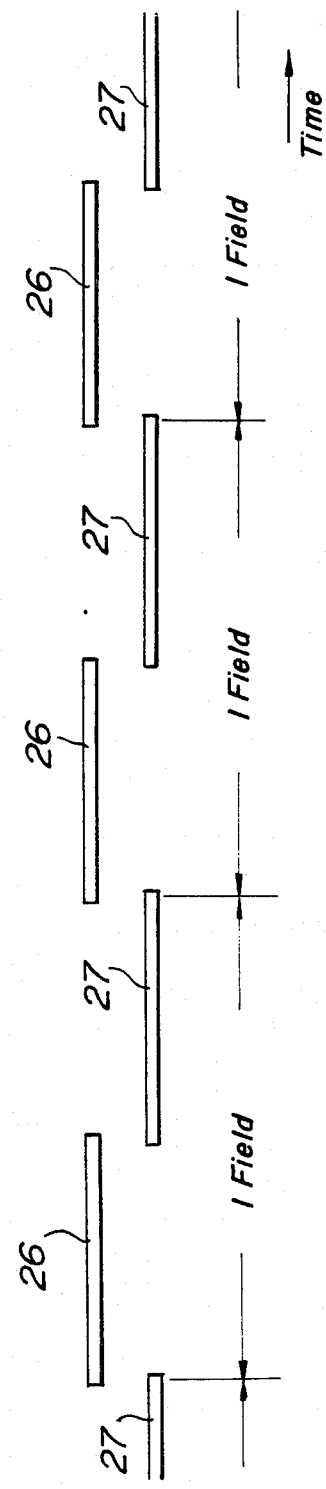
FIG. 8 diagrammatically illustrates the relationship between tracks with respect to time in the recording pattern illustrated in FIG. 7.
Figure 9:
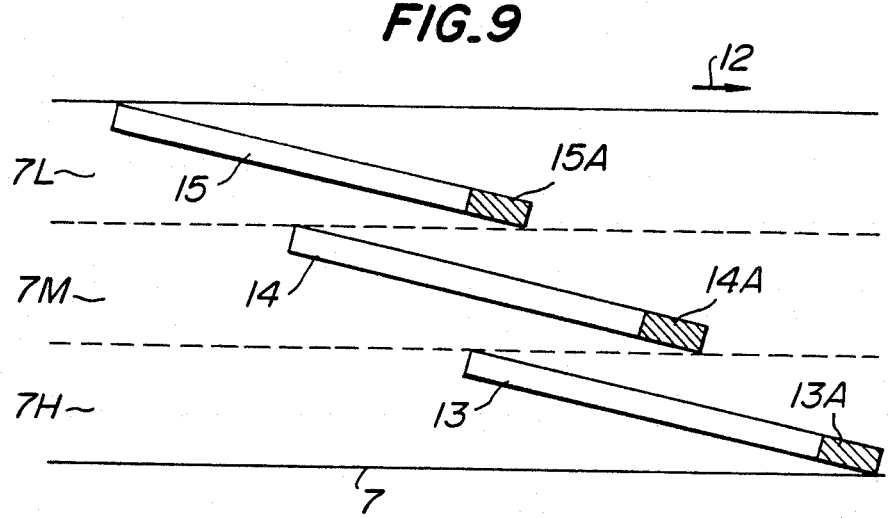
FIG. 9 illustrates a recording pattern of a video signal when the invention is applied to a PCM recording system.

The relationship between the locations of recording or playback video signals contained in the respective tracks in this embodiment is illustrated with respect to time in FIG. 8. As seen from FIG. 8, a video signal in one field is recorded in such a manner that fragmentary video signals having a period slightly longer than ½ of a field period are alternately recorded on two parallel tracks 26 and 27 of the magnetic tape 20 in a time-sequential manner.

The application of the magnetic record/playback system according to the invention to a PCM recording VTR will now be explained. However, some problems involved in an FM recording VTR will first be discussed. In this type of VTR, a synchronizing signal and a color burst signal are used to detect a time-axis variation so as to correct the time axis. To this end, a horizontal synchronizing signal and a color burst signal superposed thereon are used to detect the time-axis variation in the succeeding horizontal period. A combination of a single horizontal synchronizing signal and the succeeding color burst signal which would be employed to detect the time-axis variation causes a detection error of the time-axis variation due to random noise and further causes color shading variations at every horizontal line unless the related VTR has a good S/N ratio.

In order to remove such a detection error, use may be made of a combination of one or more horizontal lines preceding the horizontal line in question and a color burst signal for the detection of the time-axis variation in addition to the above-mentioned detection so as to correct the time-axis variation. This method is effective where a video signal of one field is continuously recorded on a single track. On the other hand, this method is ineffective in the case of a discontinuous recording time-axis, as in the present invention, in which recording tracks are switched within a picture. In other words, in this case it is not possible to fill the discontinuous parts and the method fails to eliminate color shading appearing in the picture. Due to a partial extension of the magnetic tape, minute difference of physical dimensions or friction of the related parts and the like, it may happen that the relative speed of the magnetic head with respect to the tape varies between the record and playback modes. This variation of the relative speed has been corrected by detecting the speed error on the basis of the time measurement of the preceding burst signal and the succeeding burst signal. At the time that the head is changed there is a discontinuity between those burst signals, so that it is not possible to detect a speed error. Therefore, in this method correction cannot be made at that instant.

In the PCM recording VTR, information relating to the time-axis is reproduced by reproducing a clock signal from the reproduced signal. A clock frequency component is always included in a digital recording signal so that, even if it has discontinuous points on the time-axis as found at the head changing time, it is possible to effect that correction within a very short time by reproducing the clock immediately after the discontinuous point. Consequently, the magnetic record/playback system of the invention which effects changes in the head or record track within a picture is preferably applied to a PCM recording system, no color shading appearing on the reproduced picture unlike the FM recording system. That is, the magnetic record/playback system according to the invention is well adapted for the PCM recording VTR.

An application of the invention to the PCM recording VTR will be described with reference to FIGS. 9 to 12. In this embodiment, the tape wrap angle is slightly larger than that shown in FIGS. 1 and 2. The overlapping parts 13A, 14A and 15A of the fragmentary record patterns 13, 14 and 15 on the respective tracks 7H, 7M and 7L are used to record an error correction or detection code or a PCM sound signal thereon.

Figure 11:
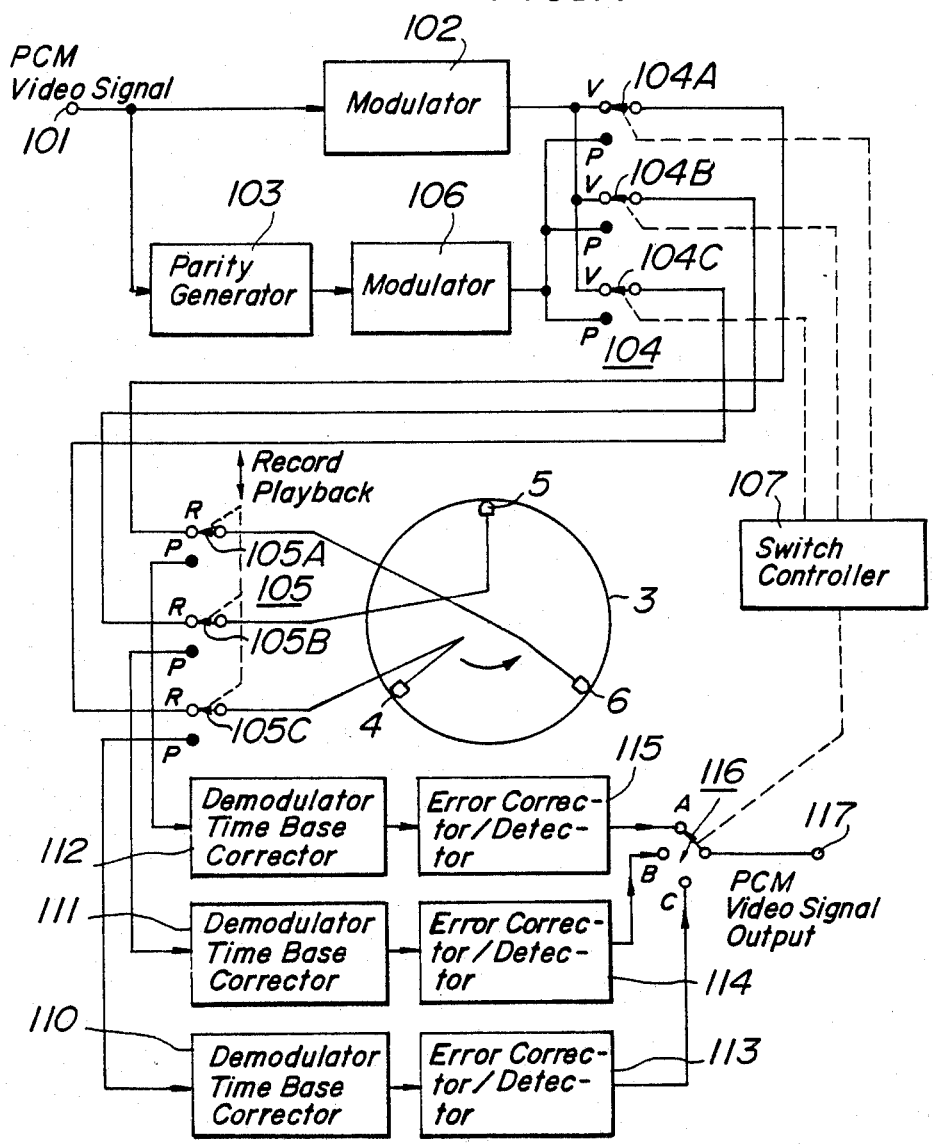
FIG. 11 is a block diagram showing a further embodiment of the invention having a circuit for recording a parity for checking/correcting error in an overlap portion of a recording pattern.

An embodiment of a magnetic record/playback system according to the invention, in which error correction or detection parity codes are recorded during the overlap periods, is illustrated in FIG. 11. In the record mode, a PCM video signal applied to an input terminal 101 is applied to a modulator 102 and a parity generator 103. The modulating output signal from the modulator 102 is applied to the magnetic heads 4, 5 and 6, through the video positions V of switch elements 104C, 104B and 104A respectively of a video/parity switch 104 and then the record positions R of switch elements 105C, 105B and 105A respectively of a record/playback switch 105. The parity generator 103 receives the video signal from the input terminal 101 to produce a parity signal corresponding to a video signal in one scanning period. The parity generator 103 is for the purpose of selfchecking or self-correcting errors occurring in the process of recording or reproducing a PCM video signal. The parity generator 103 generates parity bits, which are added to the PCM video signal.

Figure 10:
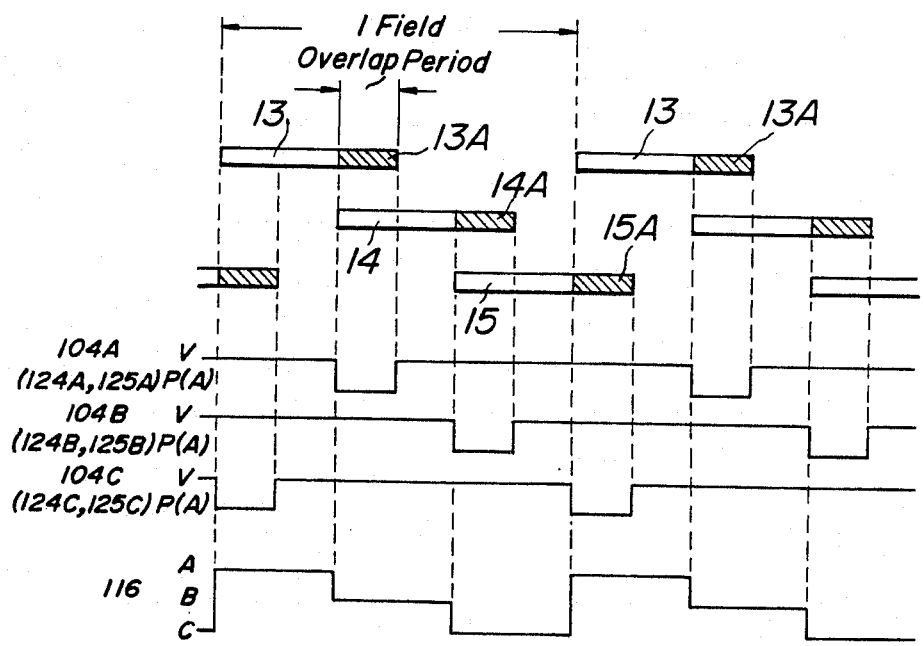
FIG. 10 diagrammatically illustrates the relationship between tracks with respect to time in the recording pattern illustrated in FIG. 9.

The parity signal is modulated by a modulator 106. The modulated parity output signal from the modulator 106 is applied to the three heads 4, 5 and 6, through the parity positions P of switch elements 104C to 104A respectively of the video/parity switch 104 and the recording positions R of the switch elements 105A to 105C. Under the control of a switch controller 107, the video/parity switch 104 is switched to the video positions V when a video signal is to be recorded by the magnetic heads 4, 5 and 6, and it is switched to parity positions P when a parity is to be recorded by the heads 4, 5 and 6. The timing relationships of these switches are illustrated in FIG. 10.

In a playback mode, the record/playback switch 105, i.e. the switch elements 105A to 105C, is turned to the playback positions P. The signals reproduced by the heads 4, 5 and 6 are applied to demodulator time-base correctors 110, 111 and 112, where the video signal and the parity signal are demodulated and any time error between the record and playback is corrected. The time-error corrected video and parity signals derived from circuits 110 to 112 are applied to error detectors/correctors 113, 114 and 115, respectively, where errors are detected and corrected on the basis of the parities. The error-corrected video signals thus obtained from circuits 113 to 115 are led to an output terminal 117, through a switch 116. The switch controller 107 successively turns the switch 116 to its contact positions A, B and C. As a result, the overlap portions 13A, 14A and 15A are removed from the respective fragmentary patterns 13, 14 and 15 to form a continuous PCM video signal. The circuits mentioned, shown in FIG. 11 are conventional and therefore further explanation of them will be omitted here. The details of the parity generator 103 and the error correctors/detectors 113, 114 and 115 are discussed in "Error Correcting Codes" by W.W. Peterson and E.J. Weldon, the M.I.T. Press, Cambridge, Mass., 1972. The details of the modulators 102 and 106 and the demodulators 110, 111 and 112 are disclosed in U.S. Pat. No. 3,108,261 "Recording and/or Reproducing System" by A. Miller and M. Park, October, 1963. The details of the time base correctors 110, 111 and 112 are shown in "Over-view of Time-Base Correction Techniques and Their Applications" by Koichi Sadashige, SMPTE Journal, Vol. 85, October 1976. Electronic switches such as MOS-FET switches are preferably used as switches 104, 105, and 116.

Figure 12:
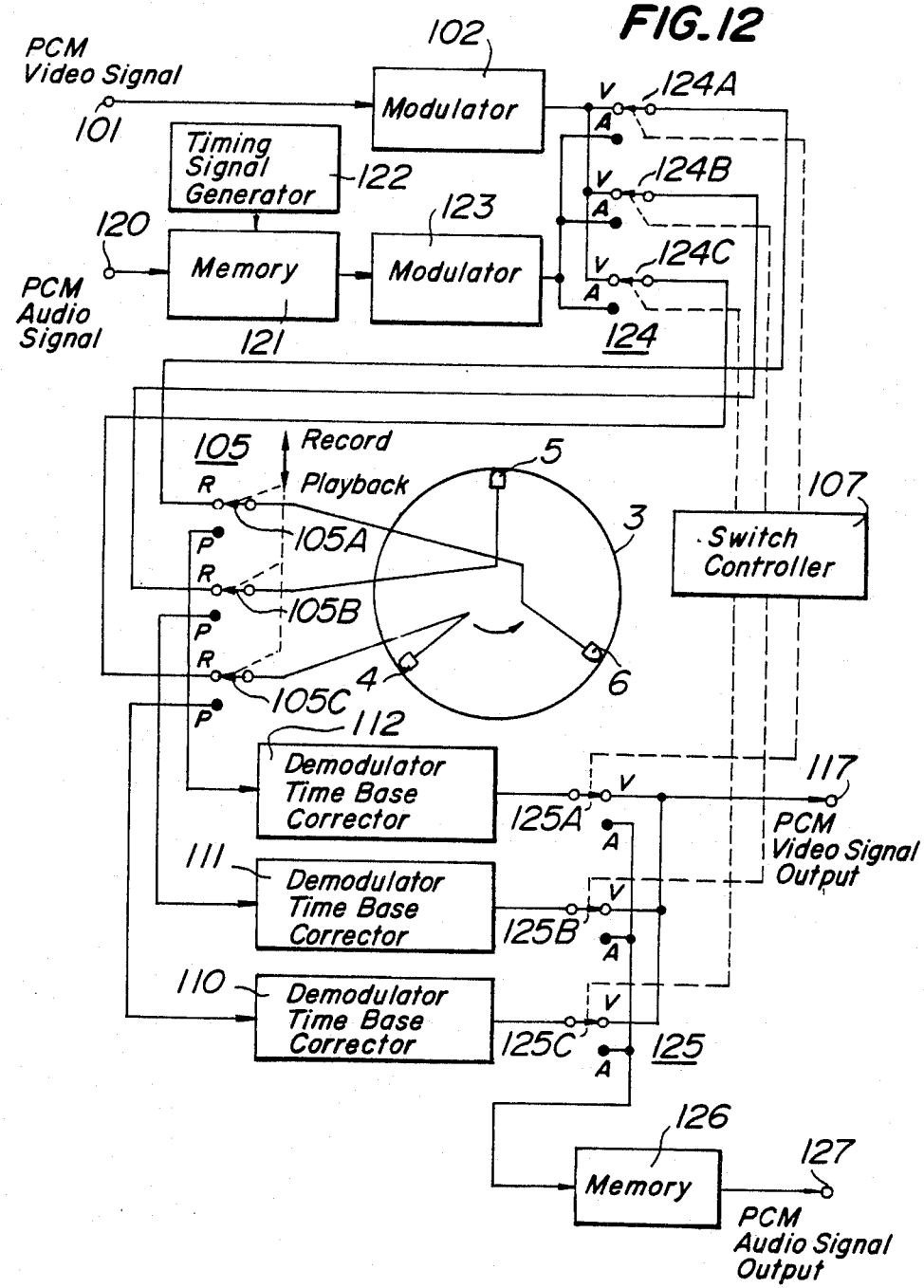
FIG. 12 is a block diagram showing a still further embodiment of the invention having a circuit for recording a PCM sound signal in an overlap portion of a recording pattern.

Referring to FIG. 12, there is shown an embodiment of the magnetic record/playback system according to the invention, in which a PCM audio signal is recorded on the overlap parts. In FIG. 12, the same numerals are used to designate like portions or parts shown in FIG. 11. In the record mode, a PCM audio signal applied to an input terminal 120 is loaded into a memory 121 where a PCM audio signal in one scanning period is temporarily stored. In response to a timing signal from a timing signal generator 122, the memory 121 produces a PCM audio signal of one scanning period during the overlap period, i.e. audio recording period. The PCM audio signal read out from the memory 121 is modulated by a modulator 123 and the modulated signal is applied to the magnetic heads 4 to 6, through the audio positions A of the switch elements 124C, 124B and 124A respectively of a video-audio switch 124 and the record positions R of the switch elements 105C, 105B and 105A respectively of the record/playback switch 105. The switching timings of the V-A positions of switching elements 124A, 124B and 124C are similar to those of the V-P switch timings of the switch elements 104A, 104B and 104C controlled by the switch controller 107 in FIG. 11, which are illustrated in FIG. 10. In the playback mode, the record/playback switch elements 105A, 105B and 105C are switched to the respective reproduction positions P. Through these reproduction positions P, signals read by the heads or head elements 4, 5 and 6 are applied to the demodulator time-base correctors 110, 111 and 112, respectively, where video signal are demodulated and any time error between the record and reproduction is corrected. The time-error corrected video signals are applied to the switching elements 125A, 125B and 125C of a video/audio separation switch 125. The V-A switching timings of the switch elements 125A, 125b and 125C are similar to the V-D switching timings of the switch elements 104A, 104B and 104C shown in FIG. 10, and are controlled by the switch controller 107. During the overlap period of a scanning period, the switch/elements 125A, 125B and 125C are turned to the respective audio positions A and, during the remaining period, these switch elements are turned to the video positions V, in time-sequential manner. In this way, the PCM video signal and the PCM audio signal are separated from each other. The PCM video signal thus separated is derived from an output terminal 117. On the other hand, the PCM audio signal thus separated is temporarily stored in a memory 126 and then is read out at a slow rate to reproduce the original PCM audio signal which in turn is obtained from an output terminal 127. In this embodiment, the same heads may be used as audio and video heads.

In an alternative embodiment, both a PCM audio signal and a parity signal may be recorded on the overlap parts of the tape tracks.

In the case of a so-called after recording, where either audio or video signal may be selectively recorded again, or either one is recorded afterwards, a blank tolerance portion may be provided between the audio part and the video part so that both of the audio and video signals can be recorded completely separately.

In the case of PCM recording, it is conceivable that, after a video signal is converted into a PCM signal, the PCM signal is divided to be recorded in two to four channels in accordance with the operation speed of the circuits. In this case, a multi-channel head or a multi-channelled head with a number of heads closely disposed may be used.

Figure 13:
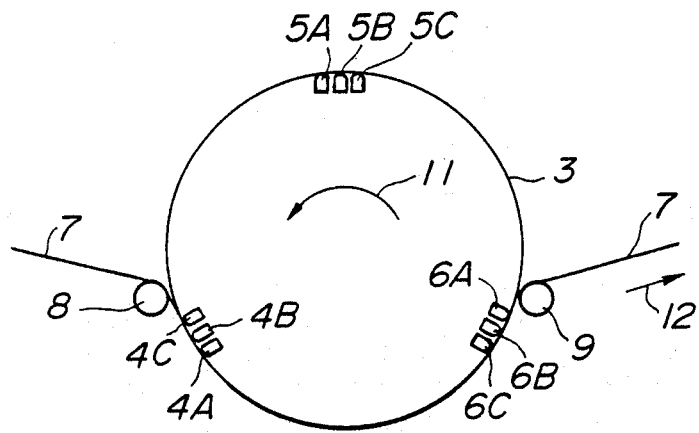
FIGS. 13 and 14 are top and side views respectively showing an embodiment of a magnetic record/playback system according to the invention when it is applied to a three channel head VTR.
Figure 14:
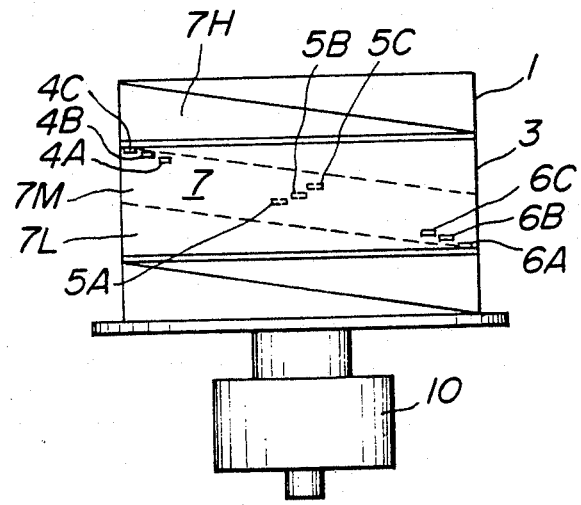

Turning now to FIGS. 13 and 14, there is shown an embodiment in which the magnetic record/playback system according to the invention is applied to three channel heads. Also, the same numerals are used to designate like parts of portions in FIGS. 1 and 2. Three sets of three-channel heads 4A, 4B, 4C; 5A, 5B, 5C and 6A, 6B, 6C are disposed close to the outer wall of the rotating head drum 3 and positioned 120° away from each other. Three heads, for example, 4A to 4C, of three sets of three-channel heads are spaced vertically and horizontally in the sequence of 4A, 4B, 4C as shown in FIG. 14.

Figure 15:
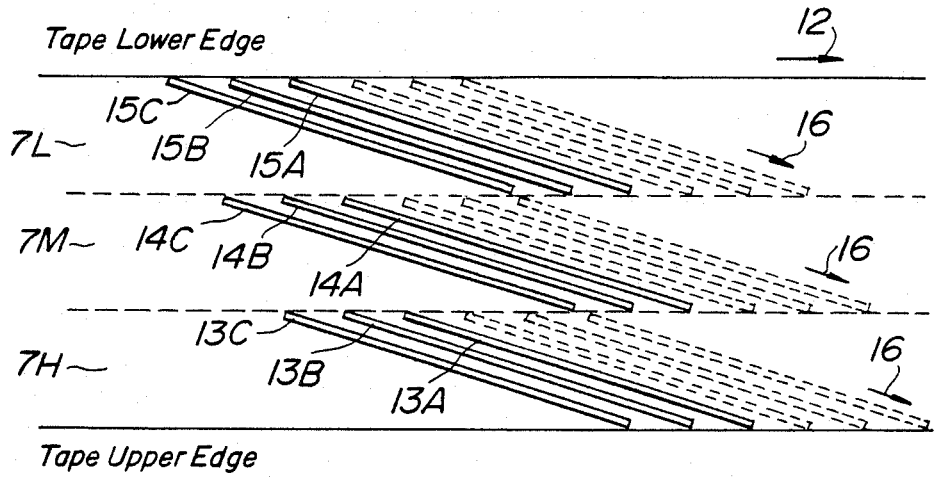
FIG. 15 diagrammatically illustrates a recording pattern of a video signal when it is recorded by the system shown in FIGS. 13 and 14.

In this embodiment, the tape 7 is wound around the rotating head drum 3 over an angle slightly larger than 120°. The respective three-channel magnetic heads 4A to 4C, 5A to 5C and 6A to 6C time-sequentially scan the upper, middle and lower tracks 7H, 7M and 7L on the tape 7, respectively. Accordingly, during one rotation of the rotating head drum 3, a video signal of three channels in one field is divided into every three channels in the time-sequential manner to be recorded on the three tracks 7H, 7M and 7L. The recorded signals are reproduced in a similar manner from these three tracks 7H, 7M and 7L. In this case, a recording pattern on the magnetic tape 7 as is illustrated in FIG. 15, where individual recording patterns 13A to 13C, 14A to 14C, and 15A to 15C are respectively formed by heads 4A to 4C, 5A to 5C and 6A to 6C. In FIG. 15, each head scans from the left upper edge to the right lower edge in a scanning direction indicated by the arrow 16. The tape 7 shown in FIG. 15 illustrates the recorded surface of the tape 7 shown in FIG. 14 and thus tape edges in FIG. 15 are illustrated upside down in comparison with the edges in FIG. 14.

Figure 16:
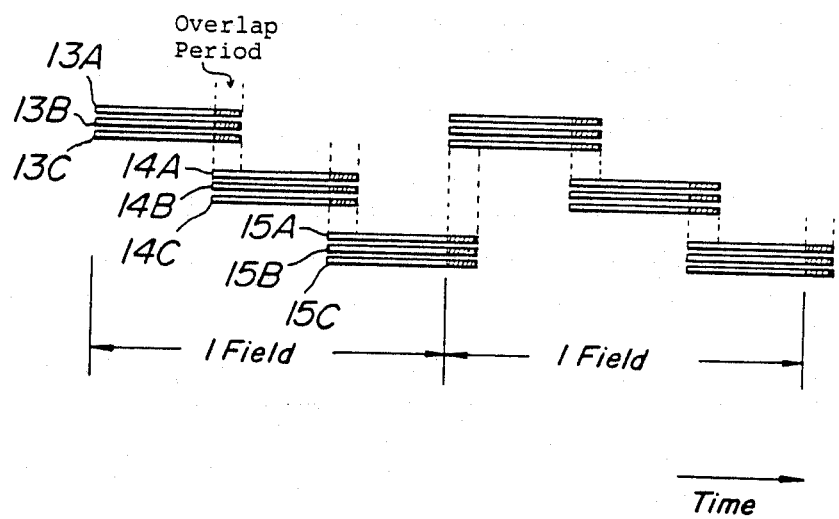
FIG. 16 illustrates the mutual relationship between tracks with respect to time in the recording pattern illustrated in FIG. 15.

The relationship between recorded or reproduced video signals in this embodiment is shown with respect to time in FIG. 16. As described above, the three sets of three channel heads 4A, 4B, 4C; 5A, 5B, 5C and 6A, 6B, 6C time-sequentially record the three channel video signals of one field on three sets of tracks 13A, 13B, 13C; 14A, 14B, 14C; and 15A, 15B, 15C. Each set of these tracks contains the three channel video signals corresponding to a period slightly longer than a ⅓ field period. As will be seen, the tape wrapping angle is slightly larger than $2\pi/3$; i.e. the spacing between two adjacent heads, and accordingly the tape scanning time of each set of three channel heads 4A, 4B, 4C; 5A, 5B, 5C; and 6A, 6B, 6C is slightly longer than ⅓ of a field period. Therefore, the respective scanning periods slightly overlap one another thereby preventing the dropout of the video signal.

Also in the present invention, a conventional tracking operation may be performed by controllably moving the head in the directions rectangular to the track extension. This tracking operation eliminates a tracking error in the picture which is formed when a playback head extends over a plurality of tracks, and as a result a perfect still or slow-motion picture is reproduced.

Figure 17:
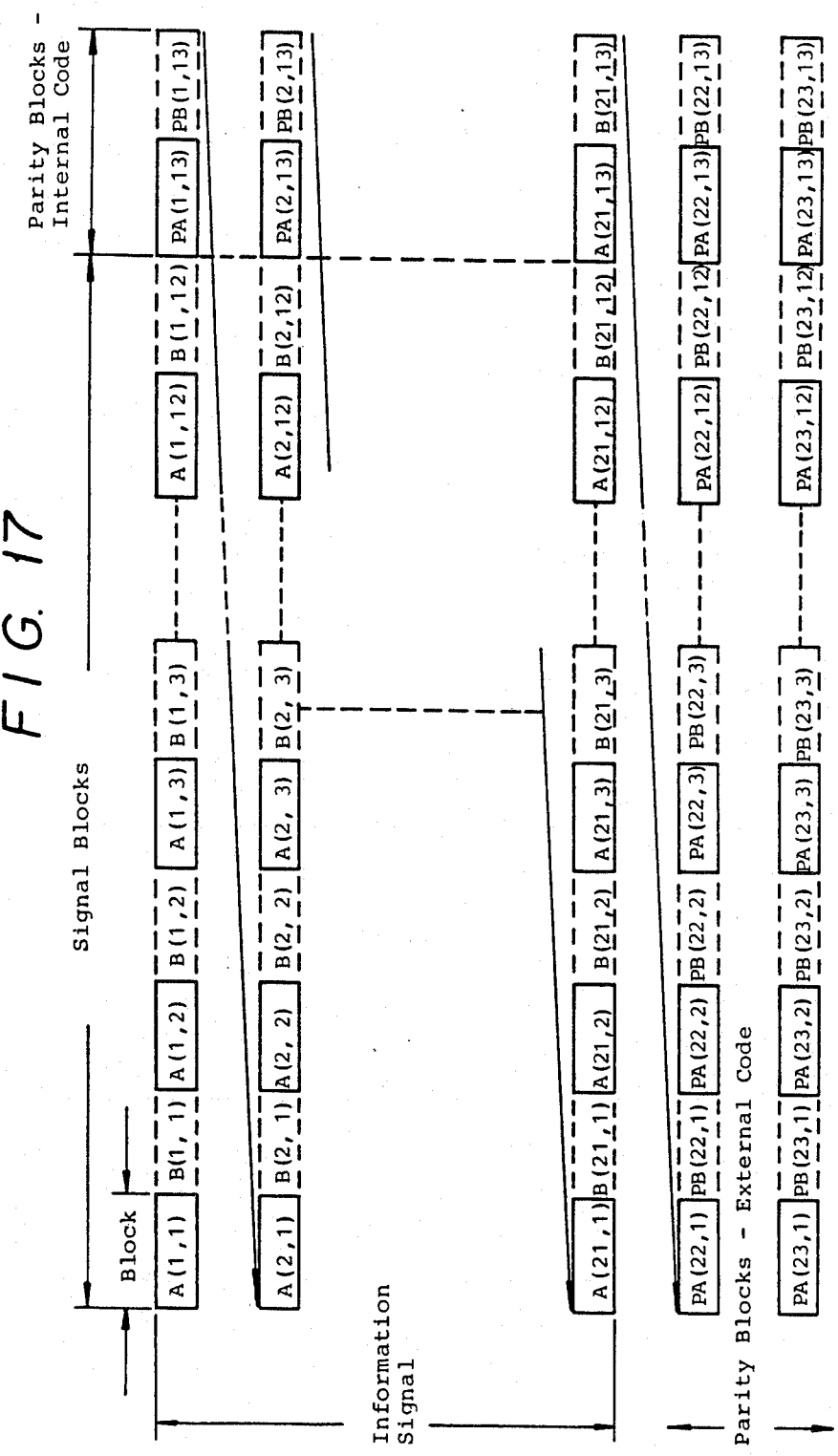
FIG. 17 illustrates an example of an error correction code.

As seen from the foregoing description, the present invention enjoys various useful effects as follows:

In addition, an error correcting/detecting signal as discussed before with reference to FIGS. 9–12 can be inserted into this overlap period. As to this error correcting/detecting signal, various types of conventional error correction codes are applicable to the present invention. FIG. 17 illustrates one example of such an error correcting code. In this example, parity blocks PA (1, 13) and PB (1, 13) as an internal code are added to a series of signal blocks A (1, 1), B (1, 1), A (1, 2), B (1, 2), ..., A (1, 12) and B (1, 12) to provide an information signal. Parity blocks PA (22, 1), PB (22, 1) ..., PA (23, 1), PB (23, 1), ... as an external code are added to a plurality of the signal series of A (1, 1), ..., A (21, 1), .... This error correction code is a so-called chain-like formation, and the internal code corrects random error and short burst errors. The external code corrects longer burst errors which cannot be corrected by the internal code.

This signal format is also applicable to a PCM video signal. Parity blocks as internal code are added to a series of PCM video signal blocks corresponding to a predetermined number of picture elements and divided into a plurality of channels. This combination of the divided PCM video signal blocks with the parity blocks is sequentially repeated until the predetermined number of picture elements of the PCM video signal which are alloted to one channel of this multi-channel system are divided sequentially. Parity blocks as an external code are added to this sequence of the combinations so that a channel signal is formed.

When this channel signal is used in the three sets of the three channel heads of FIG. 14, the portions of the tracks 13A, 13B, 13C, 14A, 14B, 14C, 15A, 15B and 15C in FIG. 16, which are not overlapped are used to record the blocks of the PCM video signal divided for each channel and the internal code, while the hatched portion indicating the overlapped period is used to record parity blocks for the external code.

Further, when error correction is made only by the external code and the internal codes are omitted, the formal portions in the tracks 13A through 13C only record the blocks for the PCM video signal divided for each channel and the hatched portion records only the parity blocks of the external code. This case is preferable for a uniform and continuous recording of the PCM video signal among the respective tracks.

Figure 18:
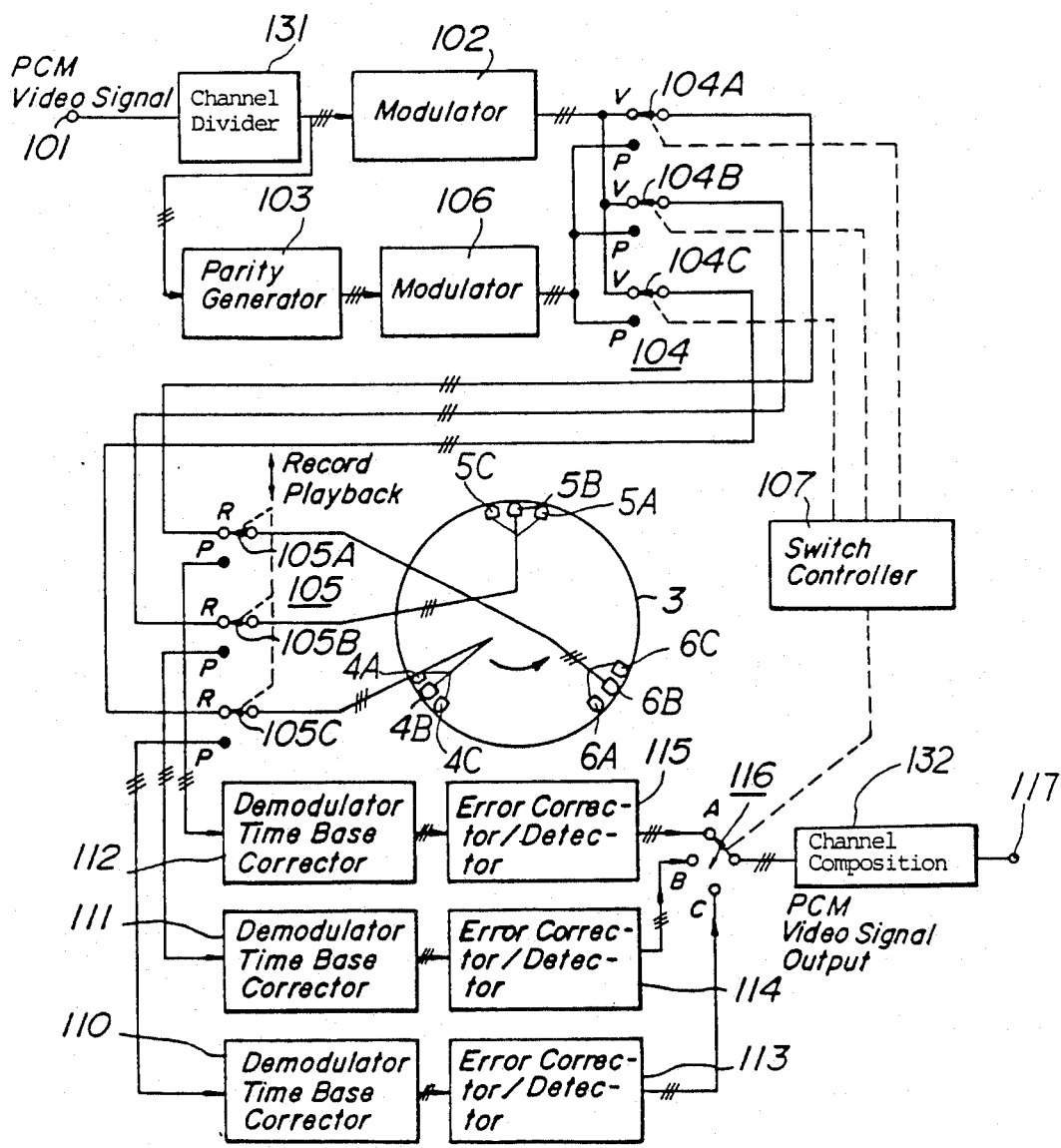
FIG. 18 is a block diagram showing an embodiment of the invention in the case of a three channel division.

FIG. 18 shows an embodiment of a magnetic record/playback system according to the invention, in which the internal codes are omitted and the external code is used as an error correcting signal as mentioned above. In FIG. 18, portions corresponding to those in FIG. 11 are indicated by the same reference numbers. In FIG. 18, a PCM video signal to be recorded is applied to a channel divider 131 via the input terminal 101. In the channel divider 131, the PCM video signal is divided into a predetermined number of channels (three channels in this embodiment). For this division, various conventional methods are applicable. For example, signals corresponding to respective picture elements may be sequentially divided in the time axis direction. The signal bandwidth is reduced by the number of division by the bit slice method in the amplitude direction or the like.

The PCM video signals in the three channels thus divided and having a narrower bandwidth are modulated by the modulator 102 and are also applied to the parity generator 103. In the parity generator 103, an error correction signal, i.e., external code parity blocks for the divided PCM signal in the 1/3 field is generated and then is applied to the modulator 106 at a predetermined timing. The operating timings of the signals obtained from the modulators 102 and 106 are the same as those explained with reference to FIG. 11.

Under the control of the switch controller 107, the modulated signals are recorded or reproduced in accordance with the patterns illustrated in FIG. 15 or 16. The recording and reproducing operations in FIG. 18 are the same as those in FIG. 11 other than the parallel processing in the three channels. That is, in this embodiment, the PCM video signals in the three channels are processed in parallel and the PCM video signal in one channel is processed as in FIG. 11. Signals reproduced from the respective heads 4A, 4B, 4C; 5A, 5B, 5C; and 6A, 6B, 6C in each of the three channels are processed in parallel and the signals in each channel are processed as in FIG. 11.

The reproduced signals in each channel are demodulated by the demodulator time-base correctors 110, 111 and 112 and any time error between the recording and reproduction is also corrected in these correctors. The time-error corrected PCM signals are applied to the error detectors/correctors 113, 114 and 115 so that errors are detected and corrected by the external code in each channel.

The error-corrected PCM signals thus obtained from the circuits 113, 114 and 115 are applied sequentially to a channel composition circuit 132 via the switch 116. The switch 116 is in synchronism with the change of the head groups 4A, 4B, 4C; 5A, 5B, 5C and 6A, 6B, 6C. The channel composition circuit 132 combines the error-corrected signals in each head group, so that an error corrected PCM video signal is obtained from the output terminal 117.

In this embodiment, the parity blocks as external code, which are disposed in the vicinity of the PCM video signals thus divided in accordance with the three channels, are recorded or reproduced in a close and corresponding relationship with the PCM video signals, so that the overlapped period is utilized effectively for error correction with an enhanced tape usage efficiency.

Figure 19:
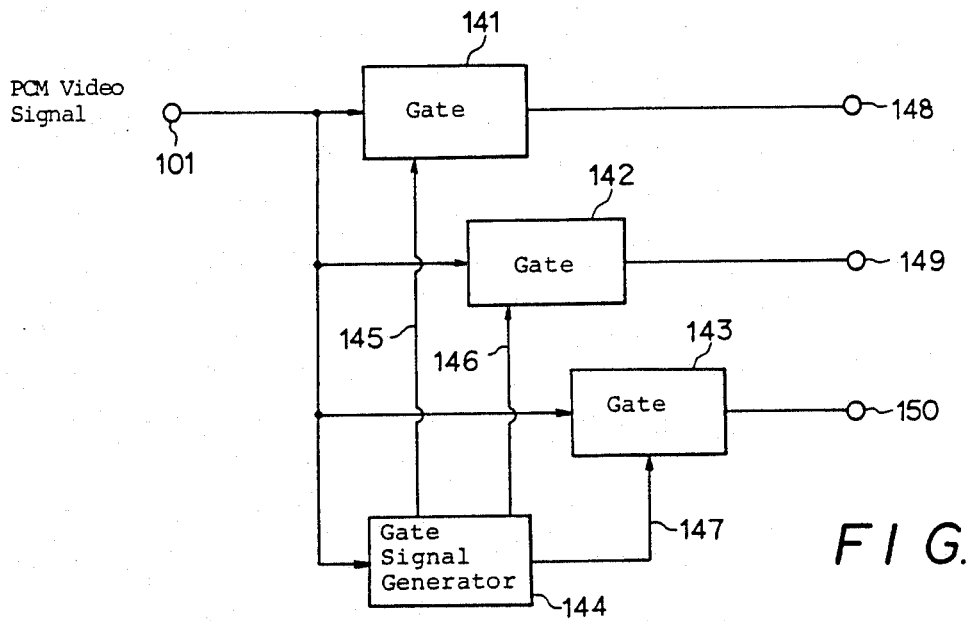
FIG. 19 is a block diagram showing an embodiment of the channel divider shown in FIG. 18.
Figure 20:
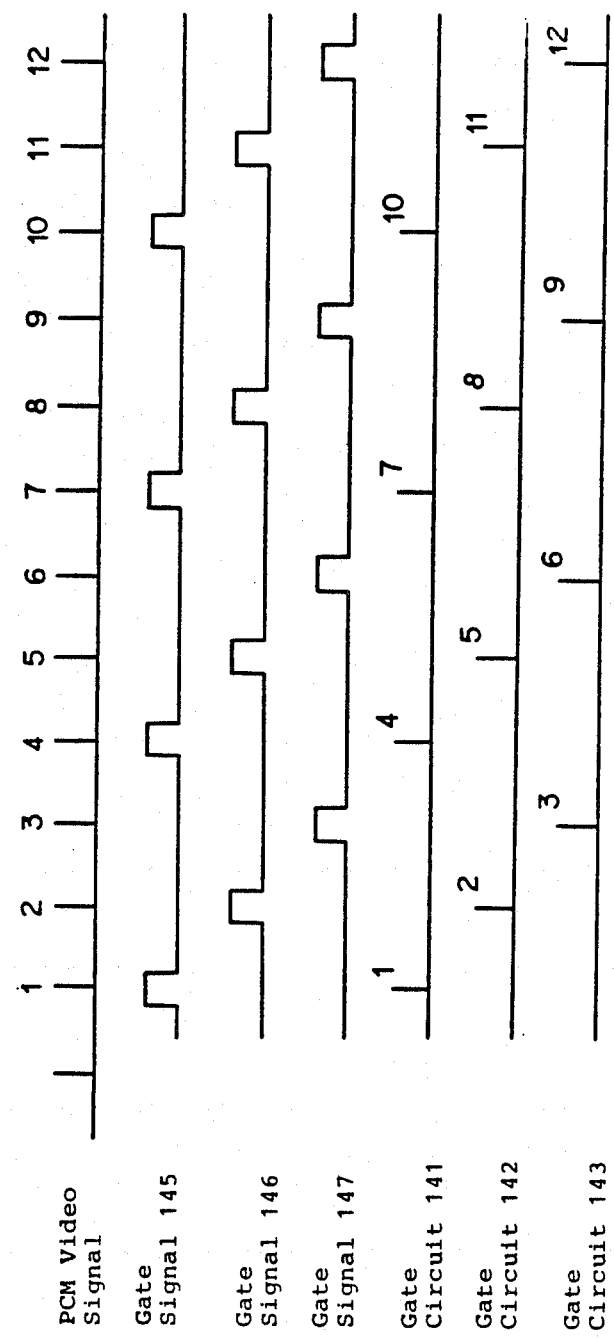
FIG. 20 is a timing chart illustrating signals at various points in FIG. 19.

An embodiment of the channel divider 131 is shown in FIG. 19. In FIG. 19, the inputted PCM video signal via the input terminal 101 is applied to gate circuits 141, 142 and 143, and also to a gate signal generator 144. The gate signal generator 144 generates gate signals 145, 146 and 147, which are applied to the gate circuits 141, 142 and 143, respectively. The gate signals 145, 146 and 147 control the gate circuit 141, 142 and 143, respectively, so that the PCM video signal is dividedly and time sequentially derived from the gate circuit 141, 142 and 143, as illustrated in FIG. 20. In this manner, the PCM video signal thus divided into the three channels and thus having a lower bit rate provides signals obtained from output terminals 148, 149 and 150 which are applied to the modulator 102.

Figure 21:
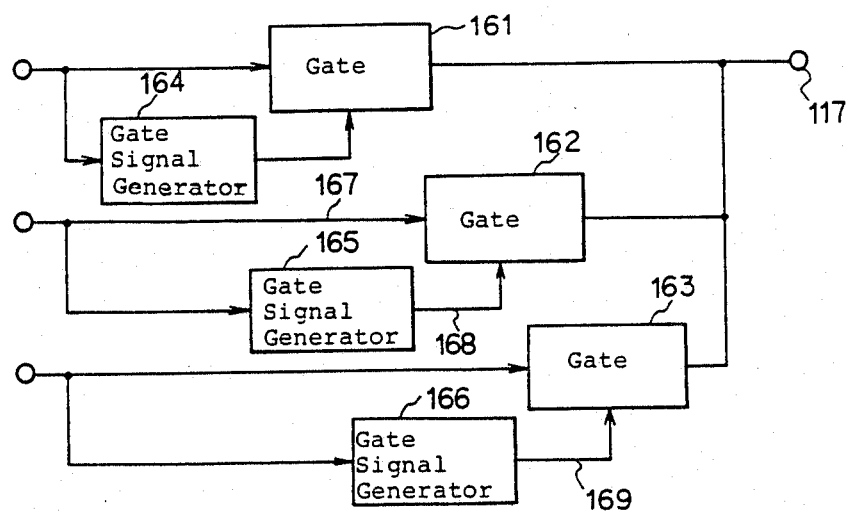
FIG. 21 is a block diagram showing an embodiment of the channel composition circuit shown in FIG. 18.

FIG. 21 shows an embodiment of the channel composition circuit 132. In FIG. 21, the three channel signals from the switch 116 are applied to gate circuits 161, 162 and 163 and gate signal generators 164, 165 and 166, respectively. The gate signal generators 164, 165 and 166 generate gate signals 167, 168 and 169 like the gate signals 145, 146 and 147 in FIG. 20 which control the gate circuits 161, 162 and 163. The output from the gate circuit 161, 162 and 163 are combined and supplied to the output terminal 117.

In this embodiment, an error of the PCM video signal can be corrected with a reduced number of correction bits per each of the recording tracks and accordingly a short overlap period is sufficient for accommodating such error correction bits. This results in a reduced angle of tape wrapping, so that the magnetic tape can travel stably and tape scanning jitter can be reduced. In addition, this contributes to an efficient usage of tape. A high capability of error correction can be exhibited by a limited number of correction bits. Since the number of bits of the PCM video signal for one track is reduced, the memory capacity required for error correction in one track is reduced and the amount of data to be processed is reduced. An error correction is processed in a short time and the entire delay time for obtaining a reproduced signal is shortened.

Also in the present invention, a conventional tracking operation may be performed by controllably moving the head in the directions rectangular to the track extension. This tracking operation eliminates a tracking error in the picture which is formed when a playback head extends over a plurality of tracks, and as a result a perfect still or slow-motion picture is reproduced.

As seen from the foregoing description, the present invention enjoys various useful effects as follows:

(1) The tape wrap angle may be set to a value approximately $2\pi/n$ radians, where n is the number of heads and is two or more. This reduces friction of the tape against the head drum thereby minimizing tape vibration. Therefore, the running of the tape is stable.

(2) Tape loading is easy and therefore the invention is preferably adapted to a tape cassette.

(3) When a video signal of one field is recorded with respect to one rotation of the head drum, slow-motion and still pictures may readily be produced without an external memory and reciprocal movement of the tape.

(4) When the invention is applied to a PCM picture recording VTR, there is no deterioration of picture quality such as color shading due to a discontinuity of the time-axis at the instant the head performing the scanning is changed. This advantage is in addition to the advantageous effects described in paragraphs (1), (2) and 3). Consequently, a simple and stable tape transporting system as well as a reproduced picture of excellent quality is obtained.

It will be understood that the above description of the present invention is susceptible to various modifications, changes and adaptations, and the same are intended to be comprehended within the meaning and range of the equivalents of the appended claims.

What is claimed is:

1. A PCM helical-scan magnetic record/playback system for recording a PCM video signal on a magnetic tape and for playing back the recorded signal, comprising:

means for time-sequentially dividing said PCM video signal into a plurality of signal portions;

means for combining said signal portions with error correction codes relating to the respective signal portions to form a plurality of multi-channel signals;

a drum rotatable about a rotational axis for receiving said magnetic tape on its outer periphery, said magnetic tape being wound around the periphery of said drum over an angle greater than $2\pi/n$ radians with respect to said rotational axis, one rotation of said drum corresponding to one field period of said PCM video signal;

n multi-channel magnetic heads, each having a plurality of magnetic head elements for recording said multi-channel signals, respectively, and for playing back recorded multi-channel signals, where n is an integer greater than two, said n multi-channel heads being disposed about the periphery of said drum with an approximately circumferential spacing of $2\pi/n$ radians and with an axial spacing in the direction of said rotational axis of approximately 1/n multiplied by the width of said tape, the magnetic head elements forming each of said multi-channel magnetic heads being slightly spaced at least in the direction of the movement of said magnetic tape with respect to each other whereby, upon rotation of said drum, said magnetic head elements of said multi-channel magnetic heads scan simultaneously n multi-channel tracks which are timingly overlapped with other multi-channel tracks disposed along the width of said magnetic tape, and said error correction codes being allotted to signal portions corresponding to overlapped portions of said multi-channel tracks between periods in which different multi-channel heads successively record and play back said PCM video signal;

means for recording and playing back said multichannel signals on different multi-channel tracks of said magnetic tape;

means for correcting errors in playing back said multi-channel signals; and means for combining error-corrected multi-channel signals to form a PCM output video signal corresponding to said PCM video signal.

2. A PCM helical-scan magnetic record/playback system as claimed in claim 1 wherein the parts of said PCM video signal which are recorded on adjacent tracks of said magnetic tape overlap, said system further comprising means for recording PCM audio signals on the overlapping portions of said magnetic tape.

3. A PCM helical-scan magnetic record/playback system as claimed in claim 1 which further comprises means for stopping the travel of said magnetic tape in a playback mode while said drum is rotated thereby reproducing a still picture.

4. A PCM helical-scan magnetic record/playback system as claimed in claim 1 which further comprises means for transporting said magnetic tape at a slow speed in a playback mode while said drum is rotated thereby reproducing a slow-motion picture.

* * * * *